Patented June 19, 1928.

1,673,951

UNITED STATES PATENT OFFICE.

EDWARD J. ROGERS, OF MIAMISBURG, OHIO, ASSIGNOR TO THE WESTERFIELD PHARMACAL COMPANY, OF DAYTON, OHIO, A CORPORATION OF OHIO.

RUST REMOVING AND PREVENTING COMPOSITION.

No Drawing. Application filed September 26, 1927. Serial No. 222,219.

This invention relates to a new and useful composition for removing rust from metals, and preventing their corrosion.

It is the principal object of my invention to provide an easily-applied and quickly-drying liquid for removing rust and acid stains from metals and for preventing the formation of rust upon them.

My composition is an excellent one for preparing the metal parts of automobile bodies and other objects for painting, since it will easily and quickly remove grease, rust and acid stains from them, and will dry in as short a time as one half hour after it is applied with a brush and wiped with a rag or waste.

My improved composition is made from a liquid mixture of the following substances that are preferably used in the following proportions:

| | Per cent. |
|---|---|
| Soluble cotton (pyroxylin, $C_{12}H_{16}(ONO_2)_4O_6$) | 1 |
| Acetone ($C_3H_6O$) | 3 |
| Amyl acetate ($C_7H_{14}O_2$) | 3 |
| Phosphoric acid ($H_3PO_4$) | 24 |
| Ethyl acetate ($C_4H_8O_2$) | 69 |

My liquid composition may be quickly made in a jar, barrel or other container by first dissolving the soluble cotton such as pyroxylin in the ethyl acetate. Amyl acetate, acetone and phosphoric acid are then added in the proportions named. In the liquid mixture produced the phosphoric acid acts as the deoxidizing agent when the composition is applied to a metal object such as an automobile fender, to remove rust and acid stains therefrom. The soluble cotton and other ingredients of the mixture form a coating upon the metal to prevent its further oxidation.

The composition may be applied to the meal by a brush and then rubbed in by a rag or waste, after which the treated surface will dry quickly so that it may be painted within a half hour at least after the composition is applied. The metal part to be painted is not only quickly, but thoroughly, prepared for painting by the employment of my improved composition.

Having described my invention, I claim:

1. A rust removing and preventing composition, comprising ethyl acetate, phosphoric acid, amyl acetate, acetone and soluble cotton.

2. A rust removing and preventing composition, comprising ethyl acetate 69%; phosphoric acid 24%; amyl acetate 3%; acetone 3%; and soluble cotton 1%.

In witness whereof I have hereunto set my hand this 24th day of September, 1927.

EDWARD J. ROGERS.